(12) United States Patent
Qin et al.

(10) Patent No.: US 7,982,354 B2
(45) Date of Patent: Jul. 19, 2011

(54) ELECTRIC MOTOR

(75) Inventors: RuiFeng Qin, Hong Kong (CN); Ling Yang, Shenzhen (CN); BaoTing Liu, Shenzhen (CN); TingTuan Xu, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/875,841

(22) Filed: Sep. 3, 2010

(65) Prior Publication Data

US 2010/0326378 A1 Dec. 30, 2010

Related U.S. Application Data

(62) Division of application No. 12/201,659, filed on Aug. 29, 2008, now Pat. No. 7,821,170.

(30) Foreign Application Priority Data

Aug. 30, 2007 (CN) .......................... 2007 1 0147143

(51) Int. Cl.
*H02K 23/36* (2006.01)
*H02K 23/26* (2006.01)
*H02K 23/04* (2006.01)

(52) U.S. Cl. ......... 310/198; 310/195; 310/204; 310/151

(58) Field of Classification Search .................. 310/127, 310/130, 140–141, 151, 195, 197–198, 204, 310/206–207, 225

See application file for complete search history.

(56) References Cited

U.S. PATENT DOCUMENTS

| | | | |
|---|---|---|---|
| 4,315,177 A | 2/1982 | Ban et al. | |
| 4,437,029 A | 3/1984 | Ban et al. | |
| 4,459,087 A | 7/1984 | Barge | |
| 4,532,449 A | 7/1985 | Aoki | |
| 4,876,472 A | 10/1989 | Shiraki et al. | |
| 6,703,751 B2 | 3/2004 | Tanaka et al. | |
| 6,756,717 B2 | 6/2004 | Yamamoto et al. | |
| 6,819,025 B2 | 11/2004 | Egawa et al. | |
| 6,841,914 B2 | 1/2005 | Maeda et al. | |
| 6,891,304 B1 | 5/2005 | Cros et al. | |
| 7,239,060 B2 | 7/2007 | Cros et al. | |
| 7,550,893 B2 * | 6/2009 | Aoyama et al. | ............... 310/264 |
| 2005/0029894 A1 | 2/2005 | Egawa et al. | |
| 2006/0055262 A1 | 3/2006 | Kaneko | |
| 2007/0152532 A1 | 7/2007 | Roos et al. | |
| 2008/0093947 A1 | 4/2008 | Aoyama et al. | |

FOREIGN PATENT DOCUMENTS

| | | |
|---|---|---|
| DE | 2853319 | 7/1979 |
| EP | 1093208 B1 | 2/2006 |
| GB | 2207294 A | 7/1987 |
| JP | 10174403 | 6/1998 |
| JP | 2004088915 | 3/2004 |
| JP | 2007181320 | 7/2007 |
| WO | WO-02/21665 A2 | 3/2002 |
| WO | WO-2006/137125 A1 | 12/2006 |

* cited by examiner

*Primary Examiner* — Burton Mullins

(74) *Attorney, Agent, or Firm* — Muncy, Geissler, Olds & Lowe, PLLC

(57) ABSTRACT

A DC motor, has a stator housing accommodating a permanent magnet stator; a rotor, rotatably mounted confronting the stator, the rotor having a shaft, a rotor core fitted to the shaft and having laminations forming salient poles, a commutator fitted to the shaft adjacent one end of the rotor core, windings wound about poles of the rotor core and terminated on the commutator, the windings each being wound around a single pole of the rotor; and brush gear comprising brushes in sliding contact with the commutator for transferring electrical power to the windings.

20 Claims, 8 Drawing Sheets

ELECTRIC MOTOR

CROSS-REFERENCE TO RELATED APPLICATIONS

This application is a divisional of application Ser. No. 12/201,659, filed on Aug. 29, 2008 now U.S. Pat. No. 7,821,170, for which priority is claimed under 35 U.S.C. §120; and this application claims priority of Application No. 200710147143.5 filed in China on Aug. 30, 2007 under 35 U.S.C. §119(e), the entire contents of all of which are hereby incorporated by reference.

BACKGROUND

This invention relates to an electric motor having a wound rotor with a commutator, and in particular, to a multi-pole PMDC motor having a concentrated winding and to a cooling fan module incorporating such a motor. The term 'multi-pole' is used here to mean motors having four or more stator poles. The invention has particular application to PMDC motors having six or eight stator poles, although it is applicable with motors having 4 to 20 stator poles.

PRIOR ART

PMDC motors are well-known and have many uses. The current trend, driven by customer demand, is for smaller, lighter and/or more powerful motors. One such application is for the fan motor of a cooling module for a vehicle engine. Space is always a premium in the modern vehicle engine compartment and weight is a prime target for reducing fuel consumption. Hence the desire for a smaller, lighter motor, without a reduction in performance.

Increasing the number of stator poles say from two poles to four poles, increases the power density, which is important when trying to increase the performance of the motor. However, other factors are also affected. Normally when reducing the physical size of a motor, the performance will be downgraded, if no other design changes are made.

Wound rotors with commutators are commonly used in DC (direct current), permanent magnet motors. This type of rotor has a number of salient poles or teeth about which the armature windings are wound. The windings form coils about the teeth and the rotor has a number of slots which form winding tunnels through which the windings extend. The coils thus have two axially extending portions which lie within the slots and two end portions, known as heads, which extend transversely to the axial direction of either axial end of the rotor core. The heads provide no force and serve only to provide electrical connections between the axially extending portions of the coil. In most rotors, some of the heads cover or cross over other heads due to the arrangement of the coils and the winding technique. Thus, some heads must extend axially out from the rotor core a considerable distance in order to cross one, two or more preciously wound heads. This distance adds nothing to the motor performance but does add to the axial length of the motor and of course, to the total amount of wire used to form the coils.

One known way of reducing the head height is described in European Patent No. EP1093208 by Gate SPA shows a four pole, 16 slot motor having an armature lamination known as an asymmetric lamination. The asymmetric lamination was designed to reduce the winding head height by reducing or eliminating winding head overlap. However, this design proves to be difficult to successfully put into production due to the complex slot shapes.

Another way is to use a winding technique known as concentrated winding. A concentrated winding is a winding which it wound around a single pole. In this way, the head height is kept to a minimum, because no coils overlap coils of another pole. However, for an armature with many poles, concentrated windings are usually not a option due to the small span of the individual coils (i.e., the circumferential spacing of the axial portions of the coil) compared with the circumferential width of the stator poles, as determined by the faces of the spanned poles.

As the rotor poles are produced by making slots in the rotor core, the rotor pole number is often referred to as the rotor slot number, or simply as the slot number to reduce confusion with the stator pole number, which is then referred to simply as the pole number. Commutator segments are commonly referred to as bars. Thus a motor with 6 stator poles, 9 rotor poles and a commutator with 18 segments, is referred to as a 6 pole 9 slot 18 bar motor. This convention will be used in this specification, where appropriate. When the number of bars equals the number of slots, it is usual to not mention the number of bars. To avoid confusion between stator poles and rotor poles, the terms tooth and teeth may be used when referring to the rotor poles.

SUMMARY OF THE INVENTION

Thus, it is desirable to reduce the weight and size of a PMDC motor without reducing its performance or power. Also it is desirable to achieve this, even for a PMDC motor, having more than four stator poles. Multi-pole motors are becoming popular as a way to reduce the bar to bar voltage, otherwise commutation will be difficult for a high power motor.

One preferred way to achieve this is to reduce the axial length of the motor, making the motor more compact, lighter and reducing the amount of wire used, thus saving material cost.

One way of doing this is by using a rotor with concentrated windings.

The present invention aims to reduce the problems associated with known concentrated winding motors. In particular, it has been found that by using a multi-pole permanent magnet stator with a rotor having 1.3 to 1.6 times, especially 1.5 times, as many slots as stator poles and a commutator with twice as many bars as slots and twice as many rotor coils as slots with each salient rotor tooth having two rotor coils and each rotor coil being wound about a single respective rotor tooth produces a motor having concentrated windings with improved performance. This can result in a motor having more torque, higher efficiency and/or higher power density. A higher power density means that the motor can be smaller for the same power output or can have a higher power output for the same physical size. Often, the new motor will be both smaller and more powerful.

Accordingly, in one aspect thereof, the present invention provides a DC motor, comprising:

a. a stator housing accommodating a permanent magnet stator having 2 n poles;

b. a rotor, rotatably mounted confronting the stator, the rotor comprising a shaft, a rotor core fitted to the shaft, a commutator fitted to the shaft adjacent one end of the rotor core, windings wound about teeth of the rotor core and electrically connected to segments of the commutator; and c. brush gear comprising a plurality of brushes in sliding contact with the commutator for transferring electrical power to the windings, d. wherein the rotor core has m rotor teeth and the rotor windings has 2 m coils wound about a respective single one of the rotor teeth, each rotor tooth supporting two of said coils and the commutator has 2 m segments with each coil being connected to a respective pair of adjacent commutator segments and each segment being respectively electrically connected to two of the coils, and wherein $2.6\,n \leq m \leq 3.2\,n$.

Preferably, n is an integer greater than 2 and less than 10. Most preferably, n is 3 or 4.

Preferably, m is equal to 3 n.

Preferably, the brush gear has 2 n brushes.

Preferably, the rotor has a plurality of equalizers electrically connecting selected segments together.

Preferably, the stator has six stator poles and there are six equalizers, each equalizer electrically connecting together a respective group of the segments.

Preferably, each group of segments comprises a pair of segment circumferentially space about the commutator 23 by 60°.

Preferably, the brushes are unequally spaced circumferentially about the commutator.

Preferably, the brush gear has six brushes and the stator has six stator poles and there are no equalizers.

Preferably, the brushes are equally spaced circumferentially about the commutator.

Preferably, the stator has eight stator poles and there are twelve equalizers, each equalizer electrically connecting together a respective pair of the segments. Alternately, there are six equalizers, each equalizer electrically connecting together four respective segments equally spaced about the commutator contact surface.

Preferably, each segment of the pair of segments are circumferentially space about the commutator by 45°.

Preferably, the brushes are unequally spaced circumferentially about the commutator.

Preferably, the brush gear has eight brushes and the stator has eight stator poles and there is no equalizer.

Preferably, the brushes are equally spaced circumferentially about the commutator.

Preferably, the winding is arranged such that the winding progresses from one segment to the next segment sequentially around the commutator.

Preferably, the winding is arranged such that each tooth has two coils and each coil on a tooth is wound in opposite directions.

Preferably, the winding is arranged such that each coil is connected, at each end, to a coil wound in the opposite direction.

Preferably, each coil is connected to a first coil wound about an adjacent tooth.

Preferably, each coil is also connected to a second coil wound about a tooth spaced one tooth away.

Preferably, wherein the first coil and the second coil are located on circumferentially opposite sides of the instant coil.

Preferably, each tooth has a face facing the stator and each face has a number of axially extending grooves.

Preferably, the coils of each rotor coil pair are wound with opposite polarity and the ends of each coil are connected to adjacent segments of the commutator.

Preferably, a number of equalizers electrically connect together predetermined groups of commutator segments.

Most preferably, the motor is a 6 pole 9 slot 18 bar motor or a 8 pole 12 slot 24 bar motor.

According to another aspect, the present invention provides a cooling fan module for an internal combustion engine of a vehicle, the module comprising a housing adapted to engage a radiator of the vehicle and forming a cowling, a fan located within the cowling for generating a flow of air through the cowling, and a motor supported by the housing and driving the fan, wherein the motor is a PMDC motor with a concentrated winding.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
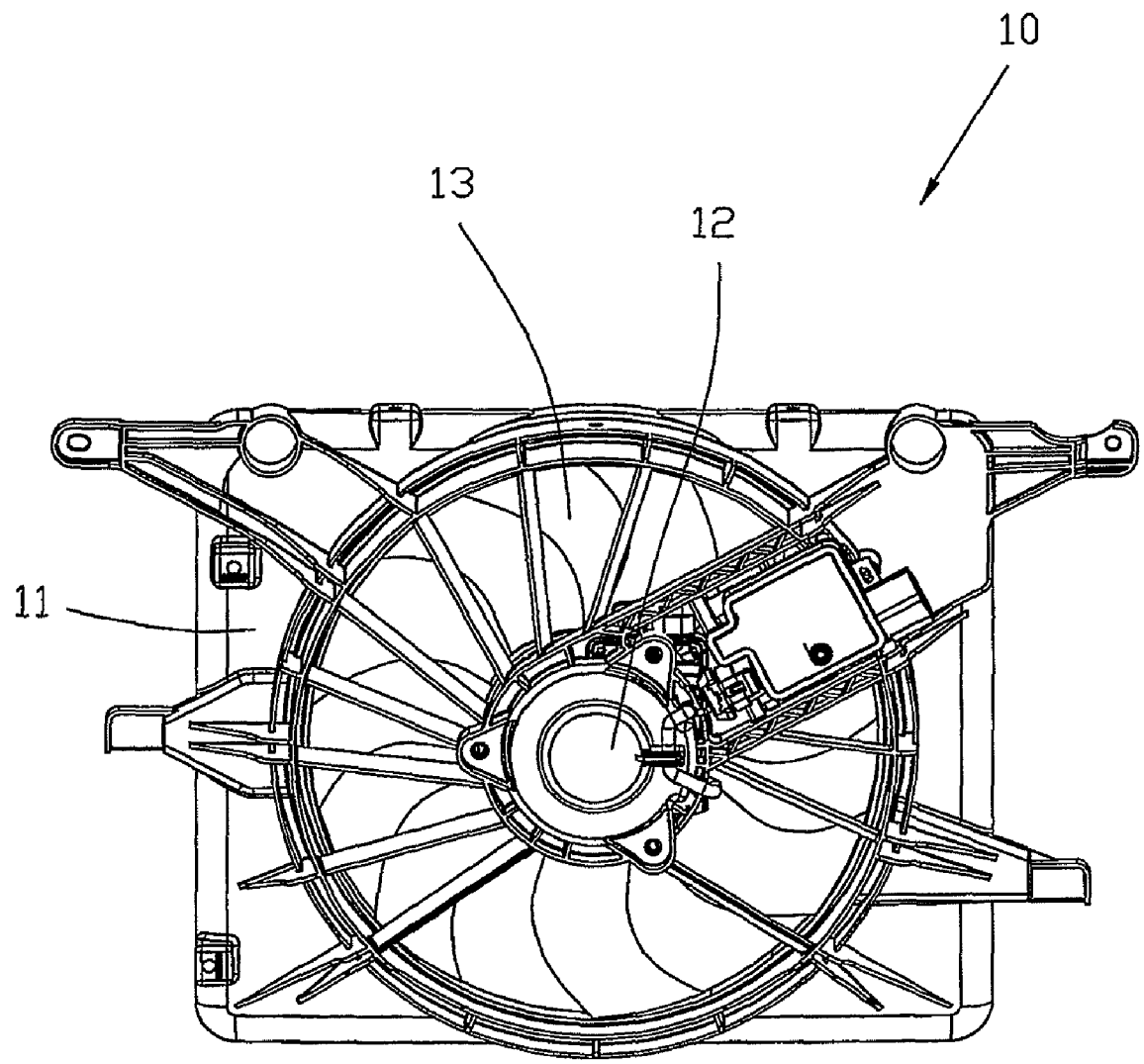
FIG. 1 illustrates a cooling fan module for a radiator of a car, incorporating a motor according to the present invention.

FIG. 1 shows a cooling fan module 10 as used for example for cooling a radiator of a vehicle. The module has a housing 11 forming a fan cowling, adapted to mate with the radiator or the like. The housing supports an electric motor 12 which drives a fan 13 for generating the flow of cooling air.

Figure 2:
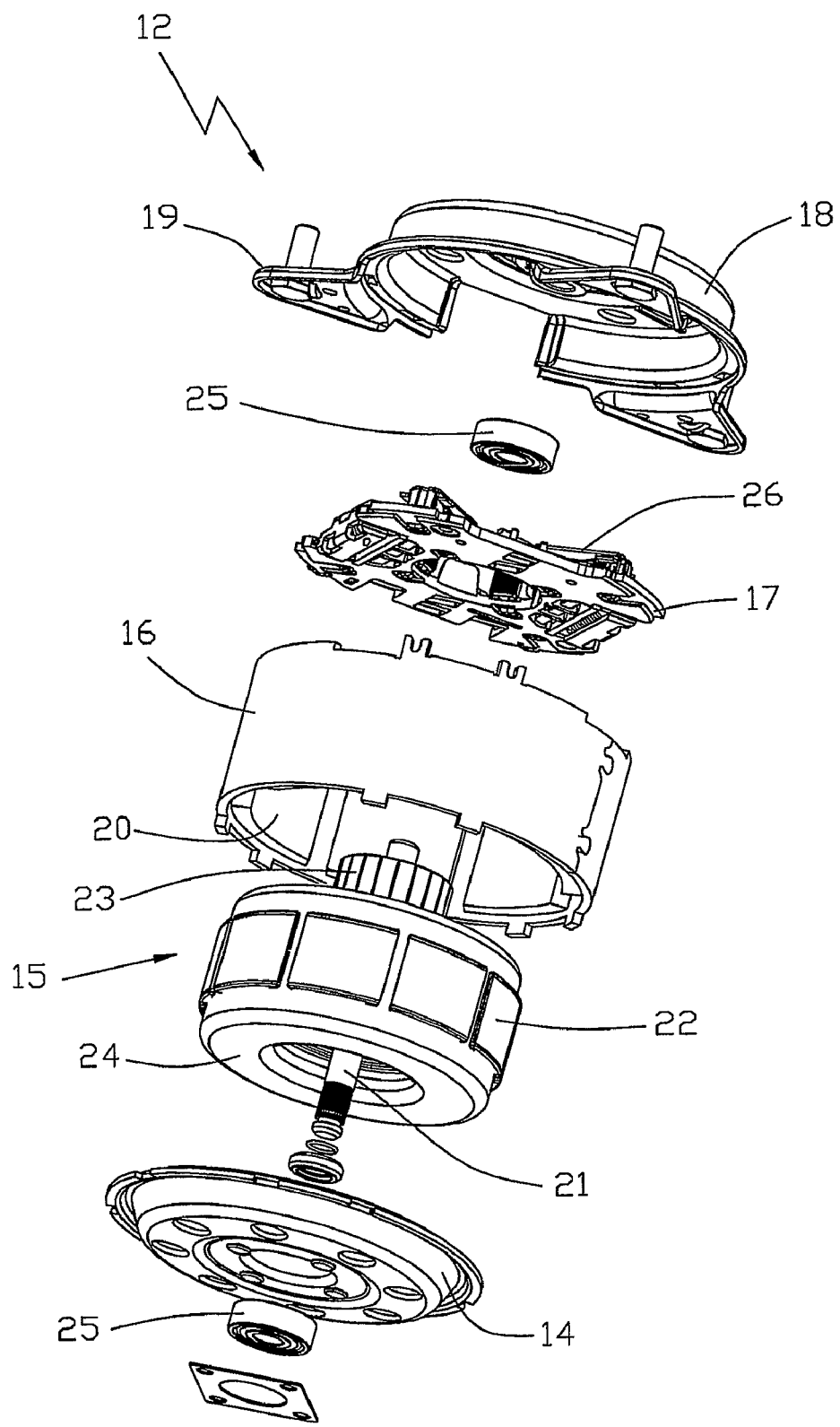
FIG. 2 is an exploded view of the motor of the cooling fan module of FIG. 1.

FIG. 2 is an exploded view of the motor 12. The motor has a first end cap 14, a rotor 15, stator housing 16, brush gear in the form of a brush card 17 supporting brushes 26, and a second end cap 18 which has mounting projections 19 for fixing the motor to the module housing. The stator housing 16 supports a permanent magnet stator which, in this case, comprises six permanent magnets 20. The stator housing has open ends which are closed by the two end caps 14, 18. The rotor 15 has a shaft 21, a core 22 fitted to the shaft 21, a commutator 23 fitted on the shaft adjacent one end of the core and windings 24 wound about teeth (salient rotor poles) of the core and terminated on the commutator. The rotor 15 is mounted within the housing with the core confronting the stator and the shaft 21 being rotatably supported in bearings 25 held by the end caps 14, 18. The shaft 21 extends through the first end cap 14 so as to engage the fan. The brush card 17 is located adjacent to and is preferably supported by the second end cap 18. The brush card 17 supports brushes slidably received in brush cages for making sliding contact with the commutator 23. In this example, there are six permanent magnets providing six stator poles and four brushes engaging the commutator at circumferentially spaced locations.

Rotor windings are represented in FIG. 2 by mass 24 on the core 22. In practice, the windings, which are coils of wire, are wound around individual teeth of the core, two coils per tooth. Each coil has two axial portions and two transverse portions. The axial portions extend axially through the rotor. The transverse portions extend in a direction transverse to the axis of the rotor and merely connect the axial portions. The transverse portions are also known as the winding heads.

Figure 3:
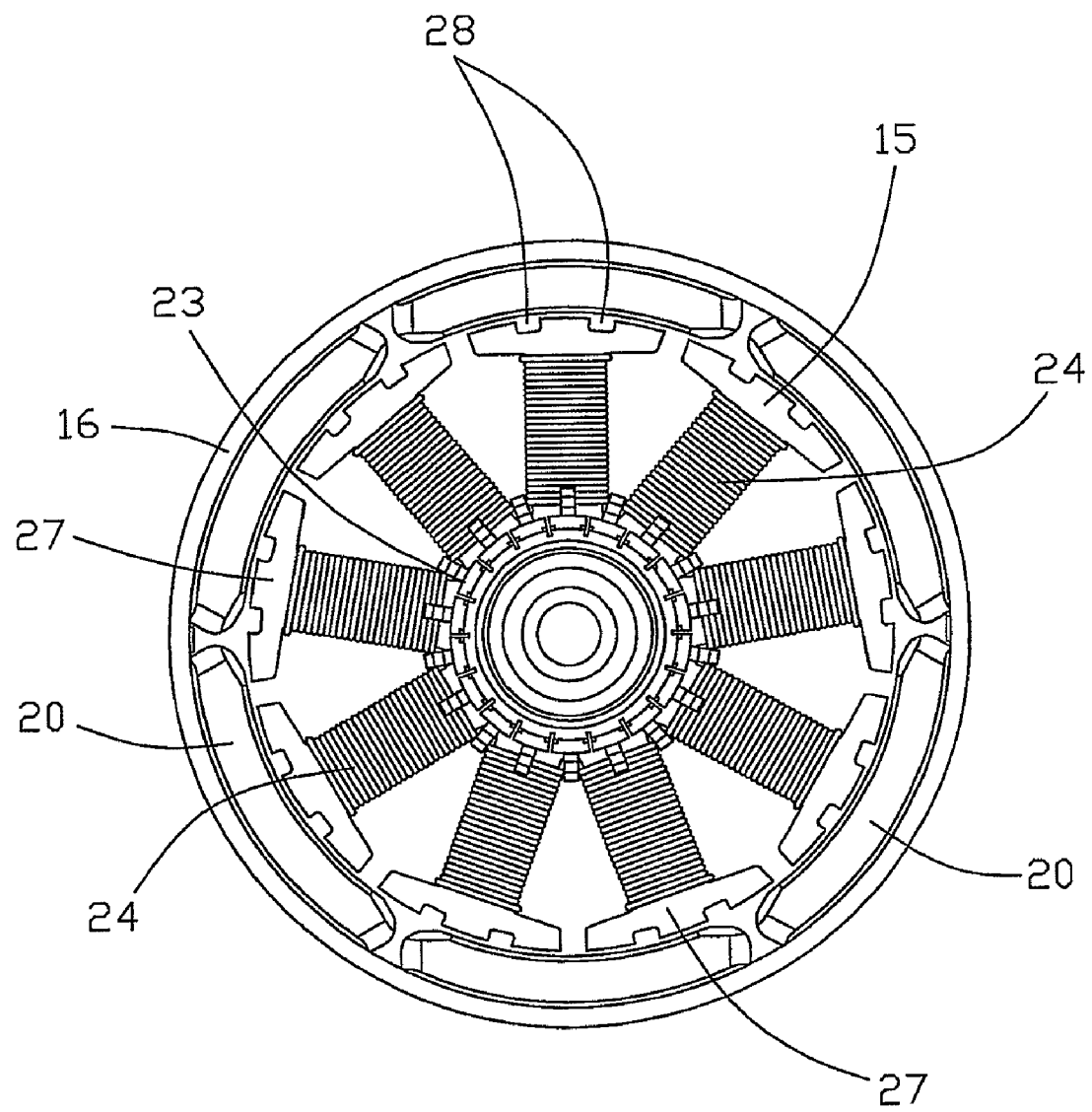
FIG. 3 is a cross sectional schematic of a 6 pole, 9 slot, 18 bar motor according to a first preferred embodiment.

As shown in FIG. 3, the stator includes the stator housing 16, and six magnets 20 forming the stator poles. The rotor 15 includes: a rotor core 22 which has nine T-shaped teeth 27; double-layer windings 24 wound on each tooth; and an eighteen-segment commutator 23.

The rotor core 22 is formed by stacking together a number of laminations stamped from sheet metal material such as mild steel, silicon steel and stainless steel. An insulating layer, known as a spider, not shown, is located on both axial ends of the stack of laminations to protect the windings from any sharp edges of the rotor core. Each spider is made from an electrically insulating material and is preferably an injection molded plastics part. An alternative to the spider is an epoxy coating applied to the core before winding the coils. However, the epoxy coating is more expensive and time consuming to apply.

Each tooth 27 is identical and has a face which faces the stator across an air gap. Each tooth 27 has two grooves 28 extending axially along the face of the tooth. Each pair of grooves 28 are equally spaced circumferentially from the center line of the tooth.

Figure 4:
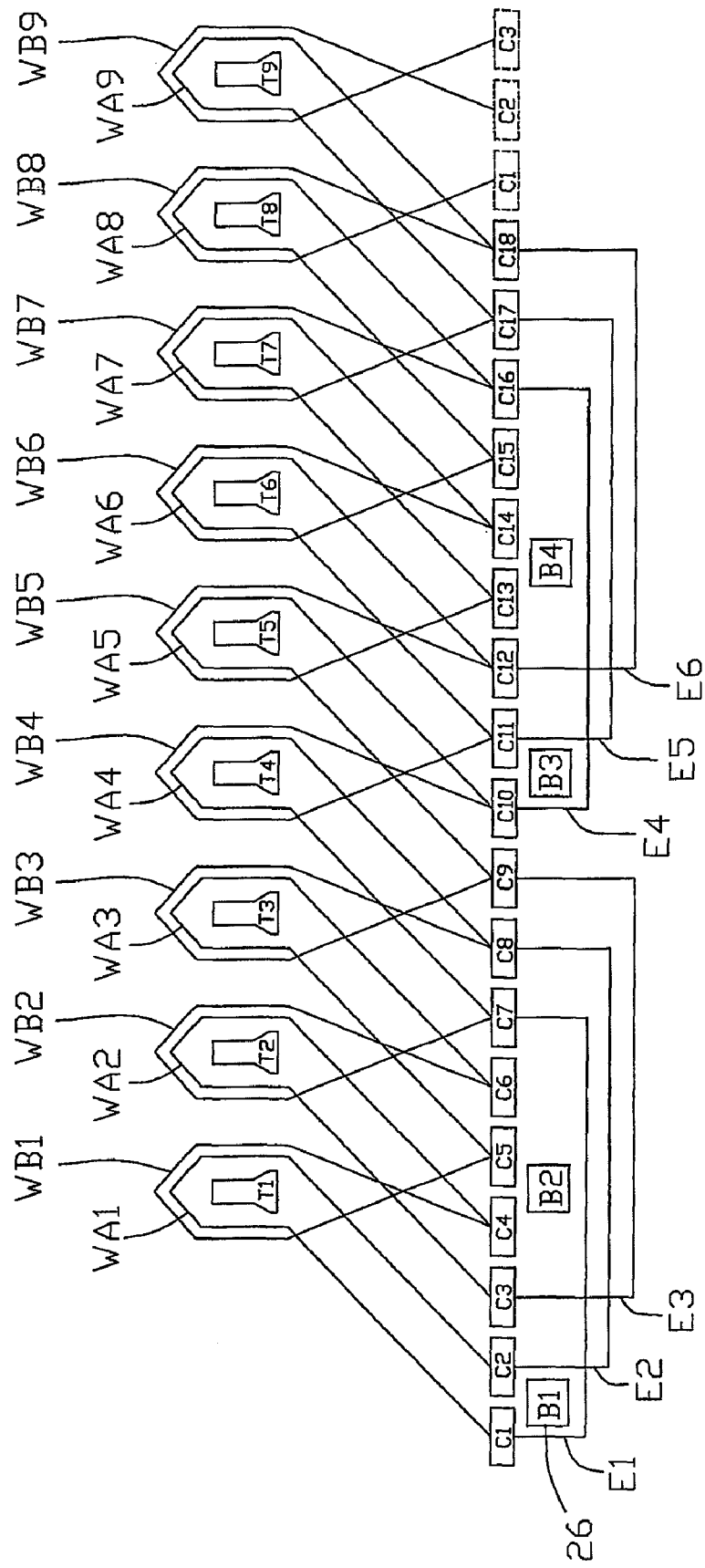
FIG. 4 is a winding schematic of the motor of FIG. 3.

FIG. 4 is a developed winding diagram of the motor of FIG. 3, with the components for the rotor laid out linearly. The teeth, commutator segments, brushes and the windings are shown schematically. The teeth T1 to T9 are laid flat along the top row. The commutator segments C1 to C18 are laid flat along the second row. Commutator segments C1 to C3 are repeated at the end of the row for ease of drawing the windings. Brushes B1 to B4 are shown beneath the commutator segments in approximate spaced locations.

The windings are represented by lines WA1 to WA9 and WB1 to WB9. Each tooth has a double winding, represented by the A winding, the inner winding, and the B winding, the outer winding. The inner A windings are shown wound clockwise about the teeth and the outer B windings are shown wound counter-clockwise about the teeth.

The winding process will now be described. Winding is started by connecting one end of the armature wire is connected to a commutator segment, say C1. The wire is then wounded around tooth T1 in a clockwise direction (CW), and then connected to commutator segment C2, forming coil WA1. Then the wire forms winding WB9 by being wound around tooth T9 in a counter clockwise direction (CCW) and then connected to segment C3. The wire is then wounded CW around tooth P2 to form WA2, and then connected to segment C4. Then the wire is wounded CCW around tooth T1, and then connected to segment C5 to form winding WB1. The winding process continues in this manner until all windings have been wound and the wire is finally terminated on the first segment C1. Thus the winding progresses from one segment to the next in sequence, while winding CW about the first pole then CCW about the previous tooth then CW about the tooth two teeth up then CCW about the tooth one tooth back, i.e., wind CW, step back one tooth, wind CCW, step forward two teeth, wind CW, step back one tooth, wind CCW, and so on until the winding is complete.

You may have noticed that in this winding method, winding WB9 will be wound before coil WA9 and thus winding WB9 will be the inner coil and WA9 will be the outer coil. However, this does not affect the operation of the motor and the inner and outer labels were chosen as a matter of convenience in describing the winding pattern.

The brushes B1 to B4 are not equally spaced about the commutator. For a 6 pole motor, one would expect 6 brushes, i.e. 3 pairs. However, this is expensive and the present embodiment uses 4 brushes, i.e. 2 pairs of brushes. As such, the brushes are spaced in diametrically opposed pairs, with the pairs spaced as though there were 3 pairs of brushes and then 1 was removed, i.e., one pair, B1 and B3, are spaced from the second pair, B2 and B4, by 60 degrees. That is, B1 is 60° from B2 which is 120° from B3 which is 60° from B4 which is 120° from B1. B1 and B4 are electrically connected together and may be, say, the negative brushes, while B2 and B3 are electrically connected and are, say, the positive brushes.

To compensate for the loss of the third pair of brushes, six equalizers E1-E6, link together or short circuit six pairs of commutator segments, thereby allowing the motor to operate as if it had three pairs of brushes.

Figure 5:
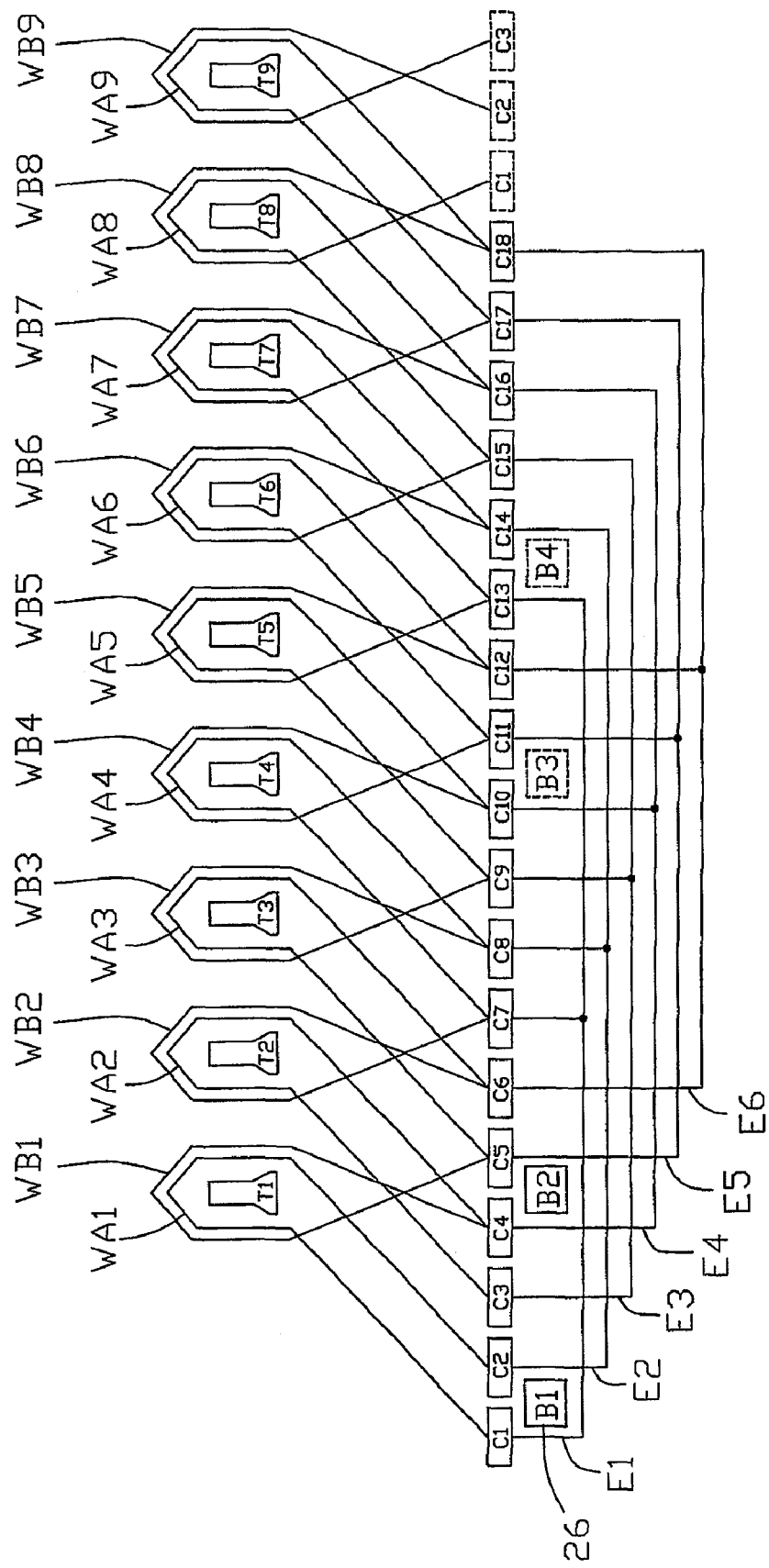
FIG. 5 is a modified winding schematic for the motor of FIG. 3.

FIG. 5 shows a slightly modified embodiment developed winding diagram for the motor of FIG. 3. The winding is the same as in FIG. 4 and like reference numerals are used for like parts. The difference is that the commutator has six equalizers E1-E6, with each equalizer electrically connecting together a group of spaced commutator segments. In this embodiment, there are three commutator segments in each group and the segments of each group are equally spaced about the commutator contact surface. The motor may have one or two pairs of brushes. With one pair of brushes, the equalizers provide power to the segments which should be in contact with the missing brushes thus allowing the motor to operate as though it had three pairs of brushes. With two pairs of brushes, the equalizers provide power to the segments which should be in contact with the missing brushes thus allowing the motor to operate as though it had three pairs of brushes. Thus the pairs of brushes are electrically connected in parallel to share the load and the equalizers prevent the problems associated with current circulating between the brushes.

Figure 6:
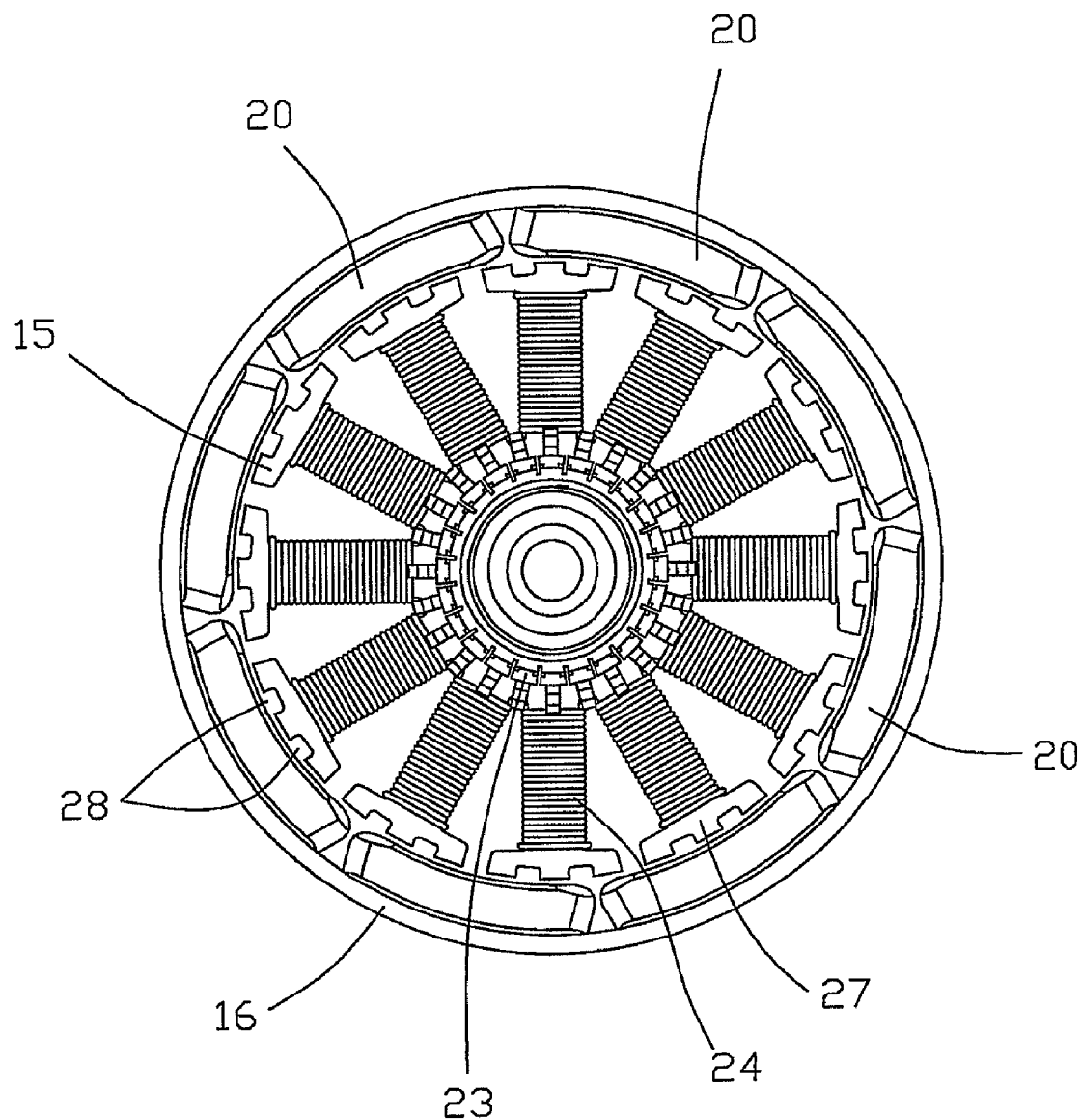
FIG. 6 is a cross sectional schematic, similar to FIG. 3, of a 8 pole, 12 slot, 24 bar motor according to a second preferred embodiment.
Figure 7:
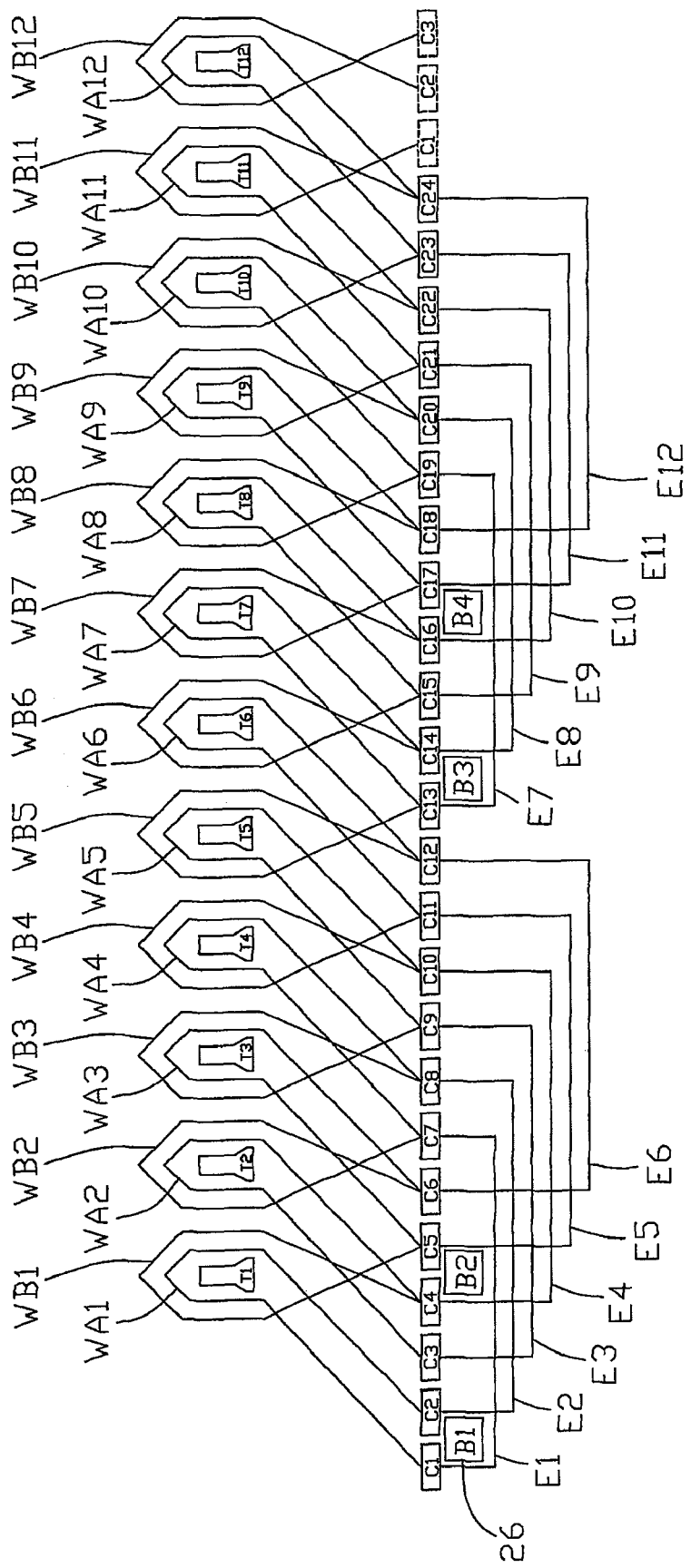
FIG. 7 is a winding schematic of the motor of FIG. 6.

FIGS. 6 and 7 illustrate another embodiment of the present invention. The motor is a 8 pole (8 stator poles) 12 slot (12 rotor poles) 24 bar (24 commutator segments) motor. There are four brushes in sliding contact with the commutator. The brushes are spaced circumferentially about the commutator and the diagonally opposite brushes are electrically connected together.

The stator includes a stator housing and eight magnet poles. The rotor includes a rotor core which has twelve teeth, double-layer windings, and a twenty-four-segment commutator.

FIG. 7 is a developed winding diagram of the armature of FIG. 6, similar to that of FIG. 4.

The teeth, commutator segments, brushes and the windings are shown schematically. The teeth T1 to T12 are laid flat along the top row. The commutator segments C1 to C24 are laid flat along the second row. Commutator segments C1 to C3 are repeated at the end of the row for ease of drawing the windings. Brushes B1 to B4 are shown beneath the commutator segments in approximate spaced locations.

The windings are represented by lines WA1 to WA12 and WB1 to WB12. Each tooth has a double winding, represented by the A winding, the inner winding, and the B winding, the outer winding. The inner A windings are shown wound clockwise about the teeth and the outer B windings are shown wound counter-clockwise about the teeth.

The winding process is similar to that used in the first embodiment shown in FIGS. 3 and 4. Winding is started by connecting one end of the armature wire is connected to a commutator segment, say C1. The wire is then wounded around tooth T1 in a clockwise direction (CW), and then connected to commutator segment C2, forming coil WA1. Then the wire forms winding WB12 by being wound around tooth T12 in a counter clockwise direction (CCW) and then connected to segment C3. The wire is then wounded CW around tooth P2 to form WA2, and then connected to segment C4. Then the wire is wounded CCW around tooth T1, and then connected to segment C5 to form winding WB1. The winding process continues in this manner until all windings have been wound and the wire is finally terminated on the first segment C1. Thus the winding progresses from one segment to the next in sequence, while winding CW about the first tooth then CCW about the previous tooth then CW about the tooth two teeth up then CCW about the tooth one tooth back, i.e., wind CW, step back one tooth, wind CCW, step forward two teeth, wind CW, step back one tooth, wind CCW, and so on until the winding is complete.

As mentioned previously with regard to the first embodiment, in this winding method, winding WB12 will be wound before coil WA12 and thus winding WB12 will be the inner coil and WA12 will be the outer coil. However, this does not affect the operation of the motor and the inner and outer labels were chosen only as a matter of convenience in describing the winding pattern.

The brushes B1 to B4 are not equally spaced about the commutator. For an eight pole motor, one would expect 8 brushes, i.e. 4 pairs. However, this is expensive and the present embodiment uses 4 brushes, i.e. 2 pairs of brushes. As such, the brushes are arranged in adjacent pairs, with the pairs spaced as though there were 4 pairs of brushes and then two alternate pairs of brushes were removed, i.e., one pair of adjacent brushes, B1 and B2, are diametrically opposite the second pair of adjacent brushes, B3 and B4, with the brushes of ach pair spaced apart by 45°. That is, B1 is 45° from B2 which is 135° from B3 which is 45° from B4 which is 135° from B1. B1 and B3 are electrically connected together and may be, say, the negative brushes, while B2 and B4 are electrically connected together and are, say, the positive brushes.

To compensate for the loss of the third and fourth pairs of brushes, there are twelve equalizers E1-E12, each linking together two commutator segments. Thus each segment is electrically connected to another segment spaced apart by 45°, thereby allowing the motor to operate as if it had four pairs of brushes. Preferably the first six segments C1-C6 are respectively connected to segments C7-C12 and segments C13-C18 are respectively connected to segments C19-C24.

Figure 8:
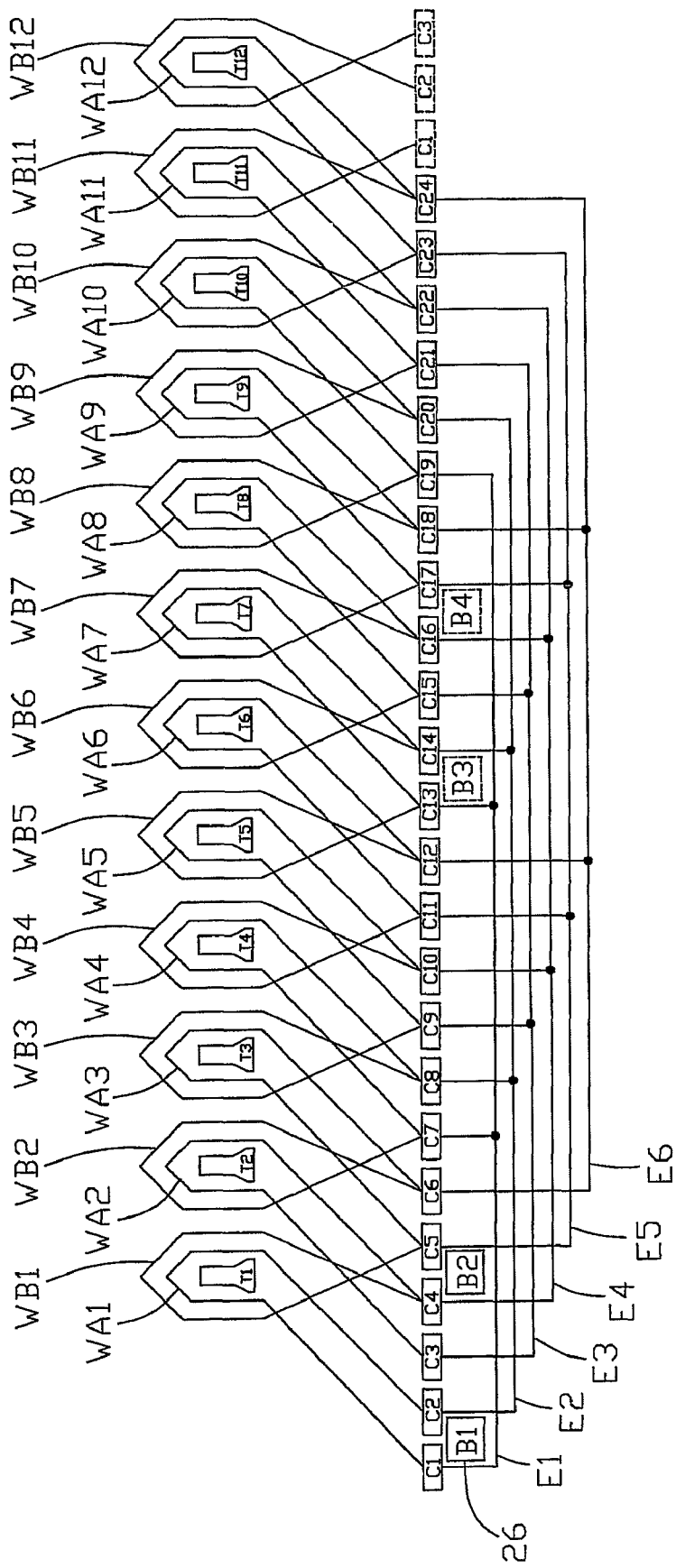
FIG. 8 is a modified winding schematic for the motor of FIG. 6.

FIG. 8 shows a slightly modified embodiment developed winding diagram for the motor of FIG. 6. The winding is the same as in FIG. 7 and like reference numerals are used for like parts. The difference is that the commutator has six equalizers E1-E6, with each equalizer electrically connecting together a group of spaced commutator segments. In this embodiment, there are four commutator segments in each group and the segments of each group are equally spaced about the commutator contact surface. The motor may have one or two pairs of brushes. With one pair of brushes, the equalizers provide power to the segments which should be in contact with the missing brushes thus allowing the motor to operate as though it had four pairs of brushes. With two pairs of brushes, the equalizers provide power to the segments which should be in contact with the missing brushes thus allowing the motor to operate as though it had four pairs of brushes. Thus the pairs of brushes are electrically connected in parallel to share the load and the equalizers prevent the problems associated with current circulating between the brushes.

Operation of the motors will now be described. When power is supplied to the motor terminals, current flows through selected coils because of the brushes contacting selected segments. The current flows through one brush, through one segment then through various coils to create the magnetic force required to drive the rotor in conjunction with the magnets of the stator.

Taking the first embodiment as the first example and looking at brush B3 of FIG. 4, when it contacts only segment C10, the current paths are:

B3-C10-WB4-C11-WA6-C12-WB5-C13-B4 (i) and
B3-C10-WA5-C9-WB3-C8-WA4-C7-E1-C1-B1 (ii)

As the current is in the reverse direction in line (ii) compared to line (i), the following magnetic poles are created:

T4(S)-T6(N)-T5(S) (i) and T5(S)-T3(N)-T4(S) (ii)

Thus we get a double South on teeth T4 & T5 and a North on teeth T3 & T6.

As brush B3 moves from C10 to C11 coil WB4 is short circuited.

When brush B3 contacts C11 only the current paths are:

B3-C11-WA6-C12-WB5-C13-WA7-C14-B4 (I)
B3-C11-WB4-C10-WA5-C9-WB3-C8-E2-C2-B1 (II)

This gives the following magnetic fields:

T6(N)-T5(S)-T7(N) (I)
and
T4(N)-T5(S)-T3(N) (II)

Thus teeth T3, T4, T6 & T7 are North and T5 is double South

Similar current paths occur for brush B2.

For the second embodiment of FIGS. 6 & 7, looking at brush B3 in FIG. 7 when it contacts segment C13 the following current paths are formed:

B3-C13-WA7-C14-WB6-C15-WA8-C16-B4 (i)
B3-C13-WB5-C12-WA6-C11-WB4-C10-E4-B2 (ii)

This gives magnetic fields of

T7(N)-T6(S)-T8(N) (i) and T5(N)-T6(S)-T4(N) (ii)

i.e. Norths on T4, T5, T7 & T8 and a double South on T6.

As B3 moves to contact C14, coil WA7 is short circuited.

As B3 contacts C14 only, the following current paths are formed:

B3-C14-WB6-C15-WA8-C16-WB7-C17-B4 (I)
B3-C14-WA7-C13-WB5-C12-WA6-C11-E5-B2 (II)

giving magnetic poles

T6(S)-T8(N)-T7(S) (I) and T7(S)-T5(N)-T6(S) (II)

Thus North poles are formed on teeth T5 & T8 and double South poles on teeth T6 & T7.

Similar current paths and magnetic poles are formed by brush B1 and the phantom brushes created by the equalizers connecting to brushes B1 and B3.

Similar operation occurs in the embodiments of FIGS. 5 & 8 and the description thereof need not be repeated.

With this unique and novel winding design, the copper weight is reduced, efficiency is improved or steel weight can be further reduced with equal performance, axial length of armature and motor are reduced, and total motor cost is minimized.

The 6 pole, 9 slot, 18 bar and 8 pole, 12 slot, 24 bar combinations are preferred for better winding factor, commutation, performance and manufacturing ability.

One embodiment of the present invention is a replacement motor for a cooling fan module of a vehicle engine cooling system. This motor achieves a 25% reduction in copper usage, a 30% reduction in motor axial length giving added savings in other materials and giving a 14% reduction in motor weight for the same performance as the replaced motor.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the invention is described with reference to preferred embodiments, it will occur to persons of the art that various modifications are possible. Therefore, the scope of the invention is to be determined only by reference to the claims that follow.

For example, while the motors of the preferred embodiments show brush gear having only 4 brushes and the use of equalisers, the invention could be implemented without the use of equalisers and having the same number of brushes as there are stator poles. In this case the brushes would be equally spaced circumferentially about the commutator.

The invention claimed is:

1. A DC motor, comprising:
a stator housing accommodating a permanent magnet stator having 2n stator poles;
a rotor, rotatably mounted confronting the stator, the rotor comprising a shaft, a rotor core fitted to the shaft, a commutator fitted to the shaft adjacent one end of the rotor core, windings wound about teeth of the rotor core and electrically connected to segments of the commutator; and
brush gear comprising a plurality of brushes in sliding contact with the commutator for transferring electrical power to the windings,
wherein the rotor core has m rotor teeth and the rotor windings have 2m coils, each coil wound about a respective single one of the rotor teeth and each rotor tooth supporting two of said coils, and the commutator has 2m segments with each coil connected to a respective pair of adjacent commutator segments and each segment respectively electrically connected to two of the coils, and
wherein $2.6n \leq m \leq 3.2n$, where n is an integer greater than 2 and less than 10.

2. The motor of claim 1, wherein n is 3 or 4.

3. The motor of claim 2, wherein m is equal to 3n.

4. The motor of claim 1, wherein the brushes are unequally spaced circumferentially about the commutator.

5. The motor of claim 1, wherein the brush gear has 2n brushes.

6. The motor of claim 1, wherein the rotor has a plurality of equalizers electrically connecting together selected segments of the commutator.

7. The motor of claim 6, wherein the stator has six stator poles and there are six equalizers, each equalizer electrically connecting together a respective group of the segments.

8. The motor of claim 7, wherein each group of segments comprises a pair of segments circumferentially space about the commutator by 60°.

9. The motor of claim 6, wherein the brush gear has four brushes and the stator has eight stator poles and there are twelve equalizers, each equalizer electrically connecting together a respective pair of the segments, the pair of segments circumferentially spaced about the commutator by 45°.

10. The motor of claim 1, wherein the winding is arranged such that the winding progresses from one segment to the next segment sequentially around the commutator.

11. The motor of claim 1, wherein the winding is arranged such that each tooth has two coils and each coil on a tooth is wound in opposite directions.

12. The motor of claim 11, wherein the winding is arranged such that each coil is connected, at each end, to a coil wound in the opposite direction.

13. The motor of claim 12, wherein each coil is connected to a first coil wound about an adjacent tooth.

14. The motor of claim 13, wherein each coil is also connected to a second coil wound about a tooth spaced one tooth away.

15. The motor of claim 14, wherein the first coil and the second coil are located on the circumferentially same side of the respective coil.

16. The motor of claim 1, wherein each tooth has a face facing the stator and each face has a number of axially extending grooves.

17. The motor of claim 1, wherein the coils of each rotor coil pair are wound with opposite polarity and the ends of each coil are connected to adjacent segments of the commutator.

18. The motor of claim 17, wherein a number of equalizers electrically connect together predetermined commutator segments.

19. The motor of claim 1, wherein the motor is a 6 pole 9 slot 18 bar motor or a 8 pole 12 slot 24 bar motor.

20. A cooling fan module for an internal combustion engine of a vehicle, comprising: a fan; and a motor according to claim 1.

* * * * *